2,767,216

DRYING OF ACROLEIN BY EXTRACTIVE SEPARATION WITH GLYCEROL

Theodore W. Evans, Oakland, and Harry de V. Finch, Berkeley, Calif., assignors to Shell Development Company, New York, N. Y., a corporation of Delaware No Drawing. Application October 31, 1955,
Serial No. 544,093

7 Claims. (Cl. 260—601)

This invention relates to the drying of aqueous acrolein.

The ability to use acrolein in many fields of endeavor is often dependent upon the absence therein of any substantial amount of water. However, acrolein as commercially available may contain water in varying amounts. The water so present may have originated, for example, as a by-product in the production of the acrolein; as a contaminant picked up during its use; or as a component introduced during processing, purifying, or other treatment of the acrolein. Removal of substantially all water from acrolein is rendered difficult by the fact that acrolein and water form an azeotropic mixture under ordinary distillation conditions. The use of solvents in processes disclosed heretofore directed to the treatment of acrolein is often rendered difficult because of the reactivity of acrolein with many of these materials under the conditions at which they are employed therein. Although processes have been disclosed heretofore enabling the dehydration of acrolein, such processes often entail the use of operative steps the nature or complexity of which render them impractical or too costly in many of the industrial uses wherein acrolein is employed in a relatively dry state.

It is, therefore, an object of the present invention to provide an improved process enabling the more efficient separation of water from water-containing acrolein with a minimum of operative steps.

A further object of the invention is the provision of an improved process enabling the more efficient removal of water from acrolein wherein the subjection of acrolein to elevated temperatures in the presence of materials capable of reacting therewith is obviated to at least a substantial degree.

Another object of the invention is the provision of an improved process enabling the more efficient removal of substantially all water from aqueous acrolein in one liquid phase extraction step.

A more specific object of the invention is the provision of an improved process enabling the more efficient removal of at least a substantial proportion of the water from aqueous acrolein-containing water in an amount equivalent to or less than that contained in the water-acrolein azeotrope. Other objects and advantages of the invention will become apaprent from the following detailed description thereof.

In accordance with the invention, water is removed from water-containing acrolein by extractive separation using glycerol as solvent. In a preferred method of carrying out the invention water-containing acrolein to be dried is subjected to a liquid-liquid extraction using glycerol as solvent at a temperature below about 50° C.

The scope of the invention is not limited with respect to the source of the water-containing acrolein to be dehydrated and may be applied broadly to the drying of water-containing acrolein whatever its origin. The acrolein dried in accordance with the invention may comprise, for example: water-containing acrolein obtained by the incomplete oxidation of hydrocarbons comprising propylene; aqueous-acrolein, the water content of which was picked up during its use in a process wherein it is employed as reactant, solvent, or the like, etc. Impurities other than water may be present in minor amount in the aqueous acrolein to be dehydrated in accordance with the invention. Such impurities comprise, for example, the hydrocarbon and carbonylic impurities normally encountered in contaminating amounts in commercially available acrolein.

The invention is not limited in scope to the treatment of acrolein containing any specific proportions of water but may be applied broadly to water-containing acrolein regardless of the amount of water in the aqueous acrolein charge. When large amounts of water are present in the aqueous acrolein to be dried it is at times desirable to effect an initial incomplete separation by other means prior to the extractive separation. Such other means may comprise, for example, a simple distillation. Acrolein and water form an azeotropic mixture which under ordinary conditions of distillation will contain about 2.6% by weight of water at 760 mm. A particular advantage of the invention resides in its ability to effect substantially complete removal of water from aqueous acrolein containing water in an amount substantially equal to or less than that contained in the acrolein-water azeotrope.

In drying water-containing acrolein in accordance with the invention, the aqueous acrolein is contacted in the liquid phase with glycerol under conditions enabling intimate contact of the aqueous acrolein and the glycerol and with opportunity for phase separation to occur. In a preferred method of carrying out the invention the aqueous acrolein to be dehydrated is subjected to liquid-liquid extraction in an extraction zone using glycerol as solvent.

Glycerol employed as solvent in the extractive separation in accordance with the invention need not be anhydrous. The presence of water in the glycerol employed as solvent will, however, limit the extent to which water is removed from the aqueous acrolein extracted therewith. The presence of any substantial amount of water in the glycerol to be used as solvent is, therefore, preferably avoided. Impurities comprising, for example, those normally encountered in commercially available glycerol may be present in relatively minor amounts. Such impurities may comprise, for example, carbonylic and/or hydrocarbon compounds in relatively minor amounts without detracting to any substantial degree from the efficiency of the process.

The extraction in accordance with the invention is carried out in conventional extraction means comprising, for example, one or more such pieces of apparatus as: extraction columns, mixer-contactors, stratification chambers and the like. For example, the aqueous acrolein to be dehydrated may be passed in liquid phase countercurrent to liquid glycerol in a suitable liquid-liquid extraction zone. The extraction zone employed may comprise, for example, a conventional type of extraction column provided with suitable solid packing, bubble plates, grid trays or the like, and provided with suitable means enabling the passage of the separate streams therethrough under conditions enabling the separate withdrawal of the liquid phases formed therein.

Other suitable means for effecting the desired extraction comprise the admixture of the aqueous acrolein and glycerol in the liquid phase in a suitable mixing zone. Such a mixing zone may comprise, for example, a chamber with suitable agitating means, such as: a conventional mixer-contactor; a packed column provided with suitable baffles, trays, packing or the like, through which the aqueous acrolein and glycerol are passed in concurrent flow. From the mixing zone the mixed streams are conducted to suitable phase separating means comprising, for example, a stratifying chamber or the like wherein phase separation is allowed to occur.

Liquid-liquid extraction of the aqueous acrolein with glycerol as solvent in accordance with the invention is effected at a temperature below about 50° C., preferably at a temperature in the range of from about 0° to about 35° C. Particularly preferred is a temperature in the range of from about 20° to about 35° C. Although extractive separation of water from glycerol at somewhat higher temperatures may be resorted to within the scope of the invention, it is to be pointed out that at temperatures substantially above 50° C. efficient dehydration becomes progressively more difficult with increase in temperature as a consequence of increased mutual solubility of acrolein and glycerol. Although the extraction proceeds efficiently at substantially atmospheric pressure, the use of subatmospheric or superatmospheric pressures during the extractive separation is comprised within the scope of the invention.

Inhibitors capable of stabilizing acrolein during the extractive separation and/or during subsequent storage may be introduced into the system. Suitable inhibitors comprise, for example, phenolic antioxidants such as hydroquinone, cresols, naphthols, catechols, their homologs and analogs, etc. The inhibitors may be added directly to the aqueous acrolein charge and/or to the solvent charge, or may be separately introduced into the system during the course of the extraction.

The extractive separation in accordance with the invention may be executed in batch, continuous or semi-continuous operation. Because of the relative simplicity of the operative steps involved, the process of the invention lends itself to utilization in the removal of water from acrolein in close association with a system wherein the introduction of the water into the acrolein occurs. The liquid-liquid extraction in accordance with the invention enables the efficient removal of water from an aqueous acrolein stream recycling within a system wherein wetting of the acrolein is a consequence of the operation pursued therein.

It has been found that under the above-defined conditions of extractive separation glycerol is substantially immiscible with acrolein. This behavior characteristic of the solvent in the presence of acrolein is peculiar to glycerol and not shared by other glycols such as, for example, ethylene glycol and diethylene glycol which are found to be miscible with the acrolein at temperatures within the range employed in the present invention.

Under the conditions of extractive separation defined herein there will be formed within the extraction zone an acrolein phase free from any substantial amount of water and glycerol, and a glycerol phase containing substantially all of the water introduced into the system. The process of the invention thus provides an exceedingly simple method for the removal of substantially all water from aqueous acrolein comprising the water-acrolein azeotrope. The invention enables the reduction of the water content to exceedingly low values, for example, below about 0.10% by weight and as low as 0.05% and less by weight, efficiently with a minimum of operative procedures and without recourse to the use of temperatures at which substantial interaction of acrolein and solvent takes place. At an extraction temperature of about 21° C. the water content of aqueous acrolein containing 7% by weight of water was readily reduced to no more than 0.03% by weight in three extraction stages using glycerol originally containing 0.2% of water as the solvent.

In continuous operation all or a part of the water-containing glycerol phase formed during the extractive separation may be subjected to a water removal step before being recycled to the extraction zone. Means employed to remove water from the water-containing glycerol phase may comprise one or more such steps as, for example, distillation, adsorption, extraction and the like. In addition to the water removal step any impurities accumulated in the glycerol phase may be removed therefrom by conventional means prior to recycling the glycerol as solvent to the extractive separation. Minor amounts of acrolein which may at times be present in the glycerol phase withdrawn from the extractive separation zone may be removed therefrom by conventional means if desired before recycling such glycerol to the extractive separation zone.

Glycerol if present in the acrolein phase formed within the extractive separation will generally be present in relatively small amounts. In general the glycerol content of the acrolein will not exceed that enabling the acrolein phase to be used as such in most cases where anhydrous acrolein is required. The relatively small amounts of glycerol present under conditions generally prevailing in the extractive separation may however be removed therefrom by conventional means such as, for example, distillation at subatmospheric pressures, without incurring any substantial loss in yield.

The following examples are illustrative of the efficiency with which water is extractively separated from aqueous acrolein with the aid of glycerol as the solvent in accordance with the invention.

EXAMPLE I

Water was added to acrolein to obtain an aqueous acrolein having a water content of 5.6% by weight. To 89 g. of the resulting aqueous acrolein there was added 134 g. of glycerol and the resulting mixture was agitated for a period of 5 minutes. Thereafter, the mixture was allowed to stand for a period of ½ hour during which time a supernatant acrolein phase separated from a glycerol phase. The entire operation was carried out at 23° C. The glycerol employed had a water content of 0.19% by weight. The phases were separated and each phase was analyzed for water and acrolein. From the data thus obtained the distribution coefficient ($K_{H_2O}$) for water between acrolein and glycerol was determined. The results obtained are tabulated in the following Table I:

*Table I*

Water content of the acrolein phase, percent by weight ---------------------------------- 0.38
Water content of the glycerol phase, percent by weight ---------------------------------- 3.70
Distribution coefficient ($K_{H_2O}$) ---------------- 0.102
Acrolein content of the acrolein phase, moles per 100 g ---------------------------------- 1.743
Acrolein content of the glycerol phase, moles per 100 g ---------------------------------- 0.108
Acrolein content of anhydrous acrolein, moles per 100 g ---------------------------------- 1.786

EXAMPLE II

To 198 g. of an aqueous acrolein having a water content of 0.44% by weight there was added 199 g. of glycerol. The glycerol employed had a water content of 0.19% by weight. The resulting mixture was agitated for 5 minutes at 21° C. and thereafter allowed to stand for a period of ½ hour at 21° C. A supernatant acrolein phase separated from a glycerol phase. The phases were separated after the ½ hour period of standing and the water content of each phase determined. The water content of the acrolein phase was found to be 0.03% by weight and that of the glycerol phase 0.62% by weight.

EXAMPLE III

In a plurality of operations the extraction operation of the preceding Example II was repeated under substantially identical conditions but with the exception that the time of standing (stratification) after the five minute agitation period was varied. At the end of each run the phases were separated and analyzed for their acrolein content. The time of standing, that is, the time elapsed between agitation and separation of phases, and the result obtained in terms of acrolein content of each phase, are indicated in the following Table II:

Table II

| Run No. | Standing Time, Hrs. | Acrolein Content, Moles per 100 g. | |
|---|---|---|---|
| | | Acrolein Phase | Glycerol Phase |
| 1 | 0.5 | | 0.101 |
| 2 | 1.2 | | 0.103 |
| 3 | 2.5 | 1.743 | |
| 4 | 3.5 | | 0.103 |
| 5 | 6.1 | 1.738 | 0.102 |
| 6 | 70.5 | | 0.098 |

EXAMPLE IV

Aqueous acrolein having a water content of 0.44% by weight is dehydrated by admixture with glycerol, having a water content of 0.19% by weight, and passage of the resulting mixture through a contact mixer and a stratification chamber arranged in series flow. The contact mixer and stratification chamber are maintained at 21° C. A residence time of five minutes in the contact mixer and ½ hour in the stratification chamber is maintained. Separation of a supernatant acrolein phase and a lower glycerol phase takes place within the stratification chamber. The acrolein phase and glycerol phase are withdrawn separately from the stratification chamber. The acrolein phase so withdrawn from the stratification chamber is found to have a water content of 0.03% by weight and a glycerol content of 2.0% by weight. The glycerol phase withdrawn from the stratification chamber is found to consist of a mixture of glycerol, water and acrolein, having an acrolein content of 5.8% by weight. Less than 5% of the acrolein charged thus appears in the glycerol phase drawn from the stratification chamber.

We claim as our invention:

1. The process for dehydrating aqueous acrolein which comprises extracting said acrolein with a solvent consisting essentially of glycerol.
2. The process for dehydrating aqueous acrolein which comprises extracting said aqueous acrolein in the liquid phase with a solvent consisting essentially of glycerol.
3. The process for drying aqueous acrolein which comprises extracting said aqueous acrolein in the liquid phase with a solvent consisting essentially of glycerol at a temperature below about 50° C.
4. The process in accordance with claim 3 wherein said extraction is effected at a temperature in the range of from about 0° to about 50° C.
5. The process for drying aqueous acrolein the water content of which does not exceed that of the acrolein-water azeotrope which comprises extracting said aqueous acrolein in the liquid phase with glycerol.
6. The process in accordance with claim 5 wherein said extraction is effected at a temperature below about 50° C.
7. The process in accordance with claim 5 wherein said extraction is effected at a temperature in the range of from about 20° to about 35° C.

No references cited.